L. S. ROBERTS.
COMBINED HOT WATER AND HOT AIR HEATER.
APPLICATION FILED NOV. 17, 1916.
1,292,515.
Patented Jan. 28, 1919.
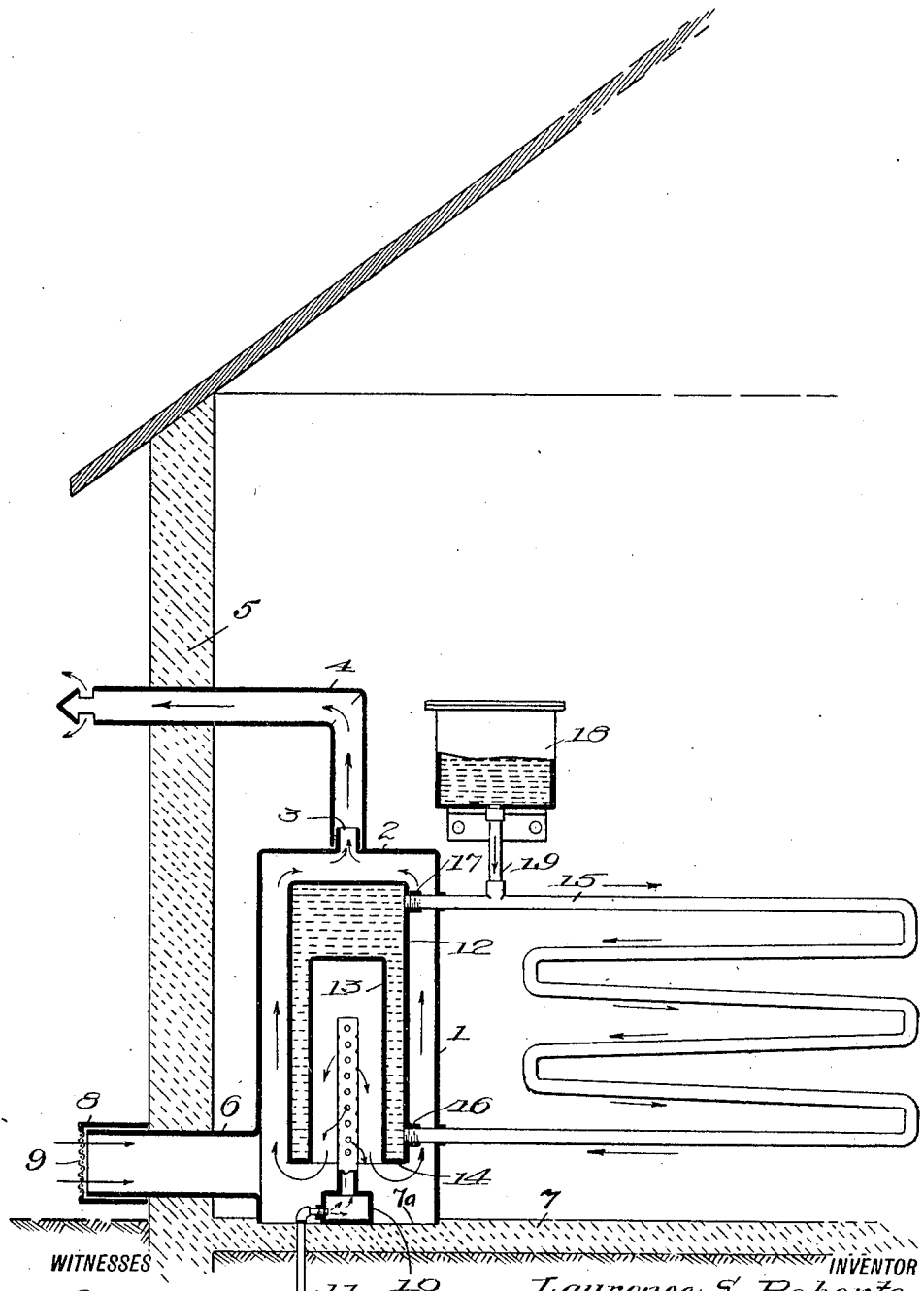
WITNESSES
F. C. Barry
N. E. Beck
INVENTOR
Laurence S. Roberts
BY
Munn & Co.
ATTORNEYS

UNITED STATES PATENT OFFICE.

LAURENCE S. ROBERTS, OF LEECHBURG, PENNSYLVANIA.

COMBINED HOT-WATER AND HOT-AIR HEATER.

1,292,515.  Specification of Letters Patent.  Patented Jan. 28, 1919.

Application filed November 17, 1916. Serial No. 131,896.

*To all whom it may concern:*

Be it known that I, LAURENCE S. ROBERTS, a citizen of the United States, and a resident of Leechburg, in the county of Armstrong and State of Pennsylvania, have invented an Improvement in Combined Hot-Water and Hot-Air Heaters, of which the following is a specification.

My invention is an improvement in combined hot water and hot air heaters, and has for its object to provide a heater of the character specified, wherein inner and outer casings are provided, the inner casing being a receptacle for containing water, and being connected with a suitable system of piping for distributing the heated water, and wherein the outer casing which incloses the inner casing is an air heater.

In the drawing is shown a diagrammatic view of the improved heater in use.

In the present embodiment of the invention the heater comprises an outer substantially cylindrical casing 1, having a closed top 2 provided with a nipple 3, which is connected with a discharge pipe 4, which may be led outside the building, passing through the wall indicated at 5. The casing 1 is also provided with an air inlet 6, which extends through the wall 5 near the floor 7 of the building, and this inlet is provided with a cap 8 having a body portion 9 of perforate material for straining the air which passes into the heater.

It will be noticed that the casing 1 is seated on the floor 7, in a depression 7$^a$ therein and fitting in said depression tightly, the said floor being in the present instance of concrete or the like, and a gas heater 10 is arranged within the casing 1 at the center thereof, the said heater being supplied from a suitable source of supply by means of a supply pipe 11.

The boiler is a double walled casing consisting of inner and outer cylindrical walls 12 and 13, respectively, concentric and spaced apart from each other, and connected at their lower ends as indicated at 14. The tops of the said casings are closed, and the space between the casings forms a receptacle for the water to be heated. The gas heater, as shown, extends up well within the inner casing 13, and the closed tops of the said casings are spaced apart a sufficient distance to provide ample water space.

A suitable system of piping 15 is connected with the water receptacle, the said piping passing through the outer casing, and engaging nipples 16 and 17, respectively, near the bottom and the top of the said receptacle. The usual expansion tank 18 is provided and this tank communicates with the pipe line by means of a pipe 19. It will be noticed that the outlet of the pipe 4 is closed at its outer end having lateral outlet openings.

In operation, when the heater is in use, cold air is drawn in through the inlet 6, and is heated, and passed out through the outlet 4, so that there are no disagreeable odors from the heater in the room in which it is arranged. The water in the inner casing is heated and circulates through the pipe in the direction indicated by the arrows, eventually returning to the water receptacle to be reheated.

The heated products of combustion from the burner pass upward within the water compartment and then downward and up alongside the outer side thereof, so that practically all the heat is utilized. The casing 1 is in effect a hood inclosing the heater proper for preventing the escape of disagreeable fumes and the like into the garage and also preventing contact of any gaseous vapors that may be in the garage, with the flame of the heater.

The heated water may be used to heat distant rooms, while the heated air in the casing 1 will heat the room in which the heater is arranged. For instance, the improved heater may be arranged within a garage, and the heated water may be piped to the main building.

I claim:

Means for heating a garage by hot water and hot air, said garage including a fire proof floor provided with a depression therein adjacent one of the walls of the garage, said means including a double walled boiler open at its lower end, a heater for said boiler disposed within said open end and seated within the depression in the floor, a tubular casing having its lower end tightly fitted in said depression and surrounding the upper end and sides of the boiler and heater therefor, said casing having a branch air inlet extending through the before mentioned wall of the garage adjacent the floor thereof and accessible to the heater, an outlet pipe leading from the upper end of the casing and through the wall of the garage, a heat distributing coil having its ends connected to the upper and lower portions of the boiler respectively, passing through the wall of the casing and supported thereby, said coil extending within the garage for heating the same and an expansion supply tank within the garage having a single connection with the aforesaid heating coil exteriorly of the casing, the air inlet pipe of the casing being so positioned that the boiler heater may be manipulated therethrough, and the heater being effectively sealed against flame contact with any gaseous mixture within the garage.

LAURENCE S. ROBERTS.